US012633020B2

(12) United States Patent
Dinu

(10) Patent No.: US 12,633,020 B2
(45) Date of Patent: May 19, 2026

(54) OUTPUT VALIDATION OF AN IMAGE RECONSTRUCTION ALGORITHM

(71) Applicant: Siemens Medical Solutions USA, Inc., Malvern, PA (US)

(72) Inventor: Petru Mihail Dinu, Algonquin, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 585 days.

(21) Appl. No.: 17/455,417

(22) Filed: Nov. 18, 2021

(65) Prior Publication Data

US 2023/0154067 A1      May 18, 2023

(51) Int. Cl.
G06T 12/20          (2026.01)

(52) U.S. Cl.
CPC .... G06T 12/20 (2026.01); *G06T 2207/10081* (2013.01); *G06T 2207/10088* (2013.01); *G06T 2207/10104* (2013.01); *G06T 2207/10108* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2018/0182133 A1*  6/2018  Tanaka .................. G06T 7/0012

FOREIGN PATENT DOCUMENTS

CN        110717857 A  *  1/2020  .......... G06K 9/6256
CN        111862249 A  *  10/2020
CN        111862251 A  *  10/2020

* cited by examiner

*Primary Examiner* — Fan Zhang

(57)          ABSTRACT

A framework for output validation of an image reconstruction algorithm. The framework receives original input data and reconstructed image data generated by the image reconstruction algorithm based on the original input data. Analytical forward projection is performed on the reconstructed image data to generate an algorithmic version of the original input data. The original input data and the algorithmic version of the original input data are applied as input to a likeness discriminator to generate a validation value that validates the image reconstruction algorithm.

20 Claims, 3 Drawing Sheets

302

Receive reconstructed image data and original input data

304

Perform analytical forward projection of reconstructed image data to generate an algorithmic version of the input data

306

Apply original input data and algorithmic version of the input data as input to likeness discriminator to generate validation value

308

Output validation value from likeness discriminator

300

101

121

CPU
104

Non-transitory
computer-readable
Media
105

Image
reconstruction
unit
106

Validation Unit
107

108

Display Device

109

Input Devices

110

119

Imaging
Device

102

120

User device

103

100

202

Receive original input data of region of interest

204

Perform image reconstruction algorithm based on original input data

206

Output reconstructed image data

200

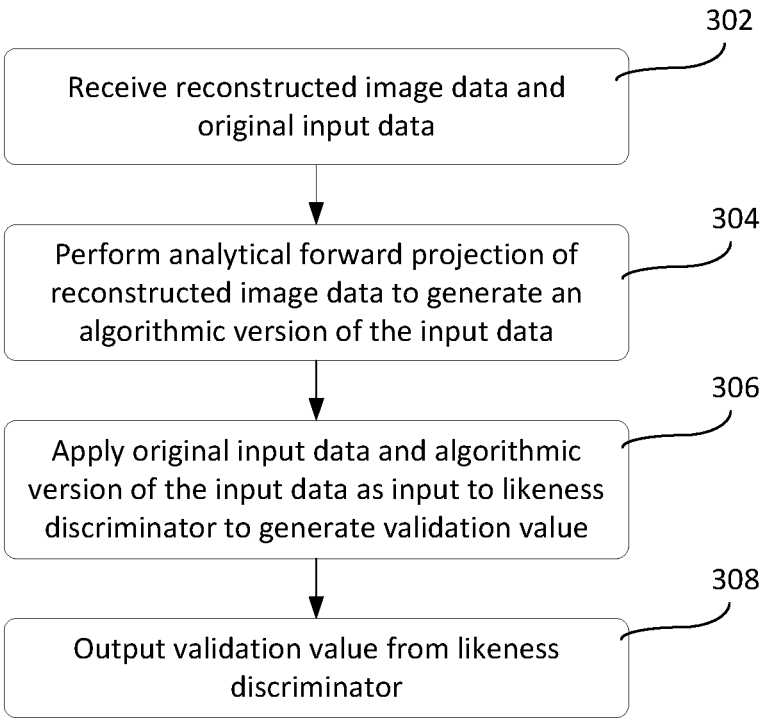

302

Receive reconstructed image data and original input data

304

Perform analytical forward projection of reconstructed image data to generate an algorithmic version of the input data

306

Apply original input data and algorithmic version of the input data as input to likeness discriminator to generate validation value

308

Output validation value from likeness discriminator

OUTPUT VALIDATION OF AN IMAGE RECONSTRUCTION ALGORITHM

TECHNICAL FIELD

The present disclosure generally relates to image data processing, and more particularly to output validation of an image reconstruction algorithm.

BACKGROUND

The field of medical imaging has seen significant advances since the time X-Rays were first used to determine anatomical abnormalities. Medical imaging hardware has progressed in the form of newer machines, such as Magnetic Resonance Imaging (MRI) scanners, Computed Tomography (CT) scanners, etc. Because of the large amount of image data generated by such modern medical scanners, there has been and remains a need for developing image processing techniques that can automate some or all of the processes to determine the presence of anatomical abnormalities in scanned medical images.

Medical image reconstruction is one of the most fundamental components of medical imaging. Image reconstruction techniques have advanced from algebraic reconstruction (AR) methods to filtered back projection (FBP) techniques and iterative reconstruction techniques, and more recently, to artificial intelligence (AI) techniques. Deep learning-based image reconstruction techniques have shown promise to lower radiation dose to unprecedented levels. Recent studies have shown that routine-dose image quality may be produced by training coevolutionary neural networks with low-dose CT images. This allows for reduction of radiation dose and artifacts, while speeding up image reconstruction time. However, medical images that are reconstructed using AI techniques are typically not used for diagnosis due to the unknown algorithmic nature of the AI techniques.

SUMMARY

Described herein is a framework for output validation of an image reconstruction algorithm. The framework receives original input data and reconstructed image data generated by the image reconstruction algorithm based on the original input data. Analytical forward projection is performed on the reconstructed image data to generate an algorithmic version of the original input data. The original input data and the algorithmic version of the original input data are applied as input to a likeness discriminator to generate a validation value that validates the image reconstruction algorithm.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

FIG. 3 shows an exemplary 300 of validating the image reconstruction algorithm by a computer system.

DETAILED DESCRIPTION

Figure 1:
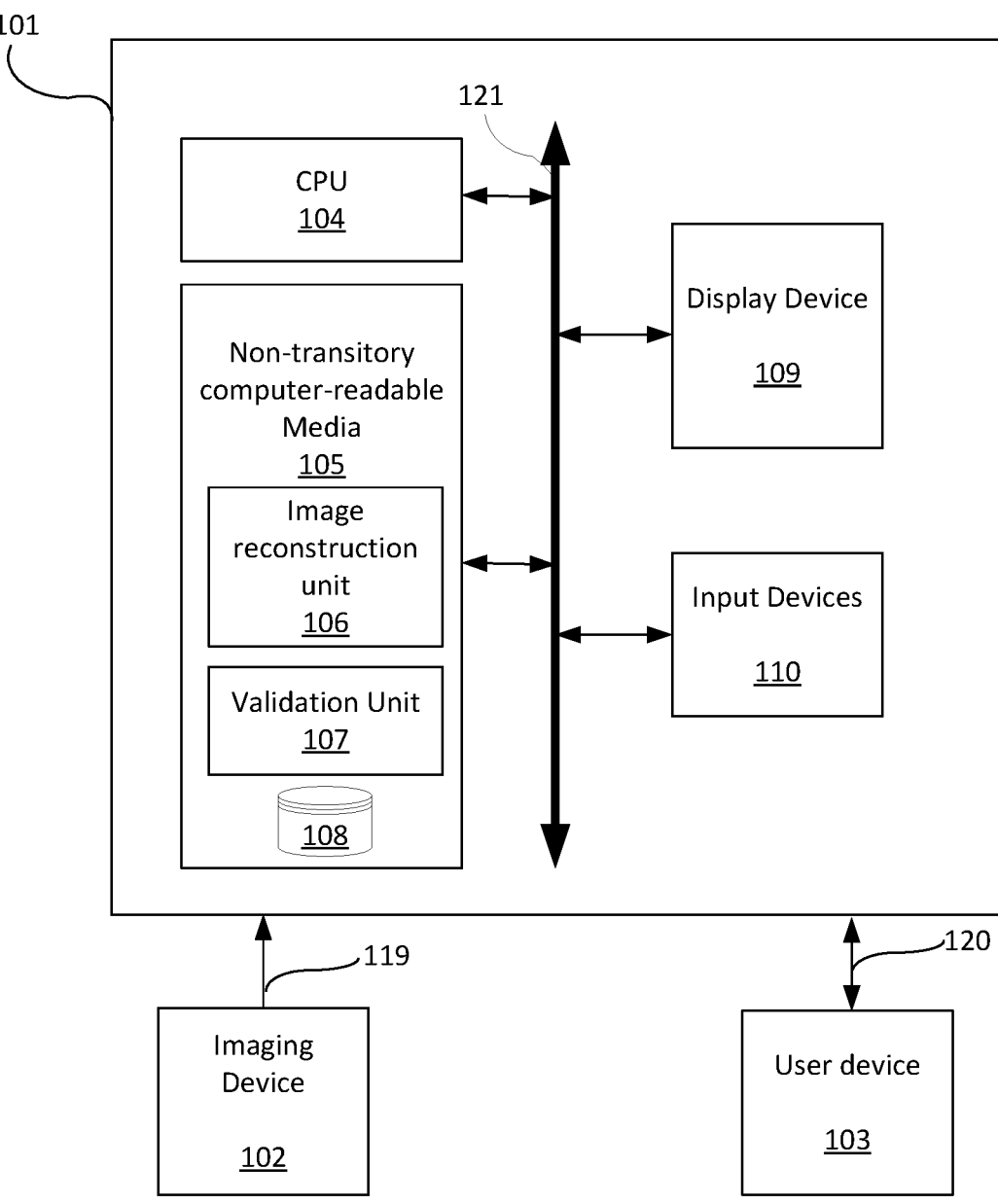
FIG. 1 is a block diagram illustrating an exemplary validation system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MM, PET (positron emission tomography), PET-CT, SPECT, SPECT-CT, SPECT-MR, MR-PET, ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displayed as a 2D image from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein. "Pixel" is typically used for discrete elements in data space, and "voxel" for elements in image space.

A framework for validating the output of an image reconstruction algorithm is described herein. Such validation may be performed at runtime and may be case-dependent. Advantageously, time-consuming and unpredictable United States Food and Drug Administration (FDA) validation of AI algorithms may not be required, particularly when one or more of the individual components (e.g., forward projection, likeness discriminator) of the current framework are already present in FDA-approved devices with, for example, iterative image reconstruction that employs a forward projection algorithm and/or iteration stop criterion using a likeness discriminator. These and other exemplary features and advantages will be described herein.

FIG. 1 is a block diagram illustrating an exemplary validation system 100. The validation system 100 includes a computer system 101 for implementing the framework as described herein. In some implementations, computer system 101 operates as a standalone device. In other implementations, computer system 101 may be connected (e.g., using a network) to other machines, such as user device 103 and imaging device 102. In a networked deployment, computer system 101 may operate in the capacity of a server, a cloud computing platform, a client user machine in server-client user network environment, or as a peer machine in a peer-to-peer (or distributed) network environment.

In one implementation, computer system 101 comprises a processor or central processing unit (CPU) 104 coupled to one or more non-transitory computer-readable media 105 (e.g., computer storage or memory device), a display device 109 (e.g., monitor) and various input devices 110 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 105. In particular, the present techniques may be implemented by image reconstruction unit 106 and validation unit 107. Image reconstruction unit 106 and validation unit 107 may be standalone components or integrated with another system, such as an electronic medical records (EMR) system.

Non-transitory computer-readable media 105 may include random access memory (RAM), read-only memory (ROM), magnetic floppy disk, flash memory, and other types of memories, or a combination thereof. The computer-readable program code is executed by CPU 104 to process data. As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 105 may be used for storing a database (or dataset) 108. Such data may also be stored in external storage or other memories. The external storage may be implemented using a database management system (DBMS) managed by the CPU 104 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

Computer system 101 receives image data 119 from imaging device 102. Imaging device 102 may be, for example, Positron Emission Tomographic (PET) system, Single Photon Computed Tomographic (SPECT) system, a computed tomographic (CT) system (e.g., a transmission CT system), a magnetic resonance (MR) system, an ultrasound system, other tomographic imaging modalities or a combination thereof.

User device 103 may include a computer (e.g., mobile computing device or personal tablet) and appropriate peripherals, such as a keyboard and display device, and can be operated in conjunction with the entire system 100. User device 103 may include, for example, a graphical user interface that collects input data 120 for manipulating data processing and displays output data (e.g., final image). User input data may be received via an input device (e.g., keyboard, mouse, touch screen, voice or video recognition interface, etc.) implemented in the user device 103.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
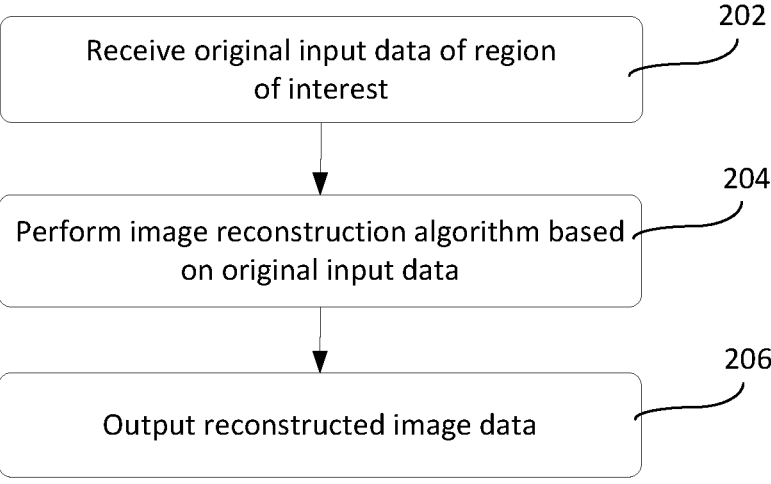
FIG. 2 shows an exemplary method of image reconstruction by a computer system.

FIG. 2 shows an exemplary method 200 of image reconstruction by a computer system. Different, or fewer steps may also be provided. Further, the method 200 may be implemented with the validation system 100 of FIG. 1, a different system, or a combination thereof.

At 202, original input data of a region of interest is received. The region of interest may be a liver, lung, heart, brain, bone, other organ or structure of interest identified for study. Original input data may be derived from tomographic data (e.g., CT, MR, PET, SPECT, PET-CT, SPECT-CT, SPECT-MR, MR-PET, ultrasound data) received from, for example, imaging device 102 or database 108.

At 204, image reconstruction unit 106 performs an image reconstruction algorithm based on the original input data to generate reconstructed image data. The image reconstruction algorithm aims to reconstruct the original input data to generate high quality image data (e.g., 2D or 3D images) for viewing and diagnosis. The image scanning process by the imaging device 102 may be formalized as:

$$g = Hf \qquad (1)$$

wherein g is the data output of the imaging device 102, f is the reconstructed image generated by the image reconstruction algorithm and H is the system response matrix which is a characteristic of the imaging device 102.

In some implementations, the image reconstruction algorithm is an iterative algorithm. An iterative algorithm typically starts with an assumed image, computes an estimation of the reconstructed image from the assumed image, compares the estimation ($Hf^k$) of the input data with the original input data and updates the estimation based upon the difference between the estimation of the input data and the original input data. Iterative algorithms are widely used mainly for the possibility of imposing constraints and steering the reconstruction using various regularizations schemes on an estimation of the reconstructed image data $f^k$. A general form of a linear iterative algorithm is as follows:

$$f^{k+1} = f^k + B[g - Hf^k] \qquad (2)$$

wherein $f^k$ is an estimation of the reconstructed image data at the $k^{th}$ iteration, the matrix vector multiplication product $Hf^k$ is called forward projection and Bg is the back projection, wherein H is the system response matrix, g is the original input data and B is a backprojection matrix. The system response matrix H defines the mapping from the image space to the data space.

Another type of image reconstruction algorithm is a multiplicative statistical, likelihood-based algorithm, such as the iterative MLEM (maximum-likelihood expectation-maximization) algorithm. The MLEM algorithm may be formulated as follows:

$$f_n^{k+1} = f_n^k / s_n * \mathrm{sum}_m \big( g_m / \big( Hf^k \big)_m * H_{mn} \big) \qquad (3)$$

wherein n and m are vector and matrix indexes and s is the sensitivity defined as $s_n = \mathrm{sum}_m(H_{mn})$, which is the summation of the system response matrices $H_{mn}$ over the index m. An iteration stopping criteria applies to both $g - Hf^k$ and $g_m/(Hf^k)_m$.

In some implementations, the image reconstruction algorithm comprises an artificial intelligence (AI) algorithm. The AI algorithm for reconstructing the image data may be trained based on training data using techniques from machine learning, such as neural networks (e.g., convolutional neural networks) or deep learning. Since the trained AI image reconstruction algorithm is not iterative, it has multiple advantages, such as higher processing speed, lower hardware resources requirements and better quality of reconstructed image data than typical iterative image reconstruction techniques. In contrast, typical iterative image reconstruction requires many more iterations (e.g., 6 to 24 or more).

At 206, image reconstruction unit 106 outputs the reconstructed image data generated by the image reconstruction algorithm. The reconstructed image data may be provided to validation unit 107 for validation.

FIG. 3 shows an exemplary method 300 of validating the image reconstruction algorithm by a computer system. It should be understood that the steps of the method 300 may be performed in the order shown or a different order. Additional, different, or fewer steps may also be provided. Further, the method 300 may be implemented with the validation system 100 of FIG. 1, a different system, or a combination thereof.

At 302, validation unit 107 receives the reconstructed image data f and the original input data g. The reconstructed image data may be generated by the image reconstruction unit based on original input data provided by imaging device 102. In some implementations, the reconstructed image data may be generated using an AI algorithm.

At 304, validation unit 107 performs analytical forward projection of the reconstructed image data to generate an algorithmic version of the original input data. Analytical forward projection is a step typically used in all iterative image reconstruction algorithms. Analytical forward projection involves the multiplication of the system response matrix H with a possible solution (i.e., reconstructed image data) f to generate the product Hf, which represents the algorithmic version of the input data.

At 306, validation unit 107 applies the original input data and the algorithmic version of the input data as input to a likeness discriminator. The likeness discriminator outputs a validation value that validates the image reconstruction algorithm. The validation value provides an answer to the question of whether the reconstructed image data is a good solution given the original input data. The validation value may be, for example, a Boolean value (e.g., "false" represents "no" and "true" represents "yes") that indicates whether or not the reconstructed image data is a good solution given the original input data.

In some implementations, the likeness discriminator is an equality operator. The likeness discriminator may be, for instance, a stop condition of an iterative image reconstruction algorithm applied to $g - Hf^k$ or $g_m/(Hf)_m$, depending on the implementation. The likeness discriminator may also be a statistical test or a minimization objective function, such as a vector norm (e.g., L1, L2) compared against a predetermined value, an image similarity metric based on, for instance, correlation, gradient difference, mutual information, kappa statistics or white noise statistical test.

At 308, validation unit 107 outputs the validation value from the likeness discriminator. The validation value may be displayed on, for example, user device 103. After validation, the reconstructed image data may be used in, for example, diagnostics, evaluation or planning for future treatment. Advantageously, the validation method 300 is very fast. The processing time may be only half of an iteration of a typical iterative image reconstruction algorithm, since no backprojection operation is involved.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A validation system, comprising:
   a non-transitory memory device for storing computer-readable program code; and
   a processor in communication with the non-transitory memory device, the processor being operative with the computer-readable program code to perform operations including performing an image reconstruction algorithm based on original input data to generate reconstructed image data;
      performing analytical forward projection of the reconstructed image data to generate an algorithmic version of the original input data;
      generating a validation value that validates the image reconstruction algorithm by applying the original input data and the algorithmic version of the original input data as input to a likeness discriminator, wherein the validation value is a Boolean value that indicates whether the reconstructed image data is a good solution given the original input data; and
      performing, in response to the validation value, diagnostics, evaluation or planning for future treatment based on the reconstructed image data.

2. The validation system of claim 1 wherein the original input data comprises tomographic data.

3. The validation system of claim 1 wherein the original input data comprises computed tomographic (CT) data, magnetic resonance (MR) data, Positron Emission Tomographic (PET) data, Single Photon Computed Tomographic (SPECT) data, PET-CT data, SPECT-CT data, SPECT-MR data, MR-PET data, ultrasound data, or a combination thereof.

4. The validation system of claim 1 wherein the processor is operative with the computer-readable program code to perform the image reconstruction algorithm by performing an artificial intelligence (AI) algorithm.

5. A validation method, comprising:
   receiving original input data and reconstructed image data generated by an image reconstruction algorithm based on the original input data;
   performing analytical forward projection of the reconstructed image data to generate an algorithmic version of the original input data;
   generating a validation value that validates the image reconstruction algorithm by applying the original input data and the algorithmic version of the original input data as input to a likeness discriminator, wherein the validation value is a Boolean value that indicates whether the reconstructed image data is a good solution given the original input data; and
   performing, in response to the validation value, diagnostics, evaluation or planning for future treatment based on the reconstructed image data.

6. The validation method of claim 5 further comprises performing the image reconstruction algorithm based on the original input data to generate the reconstructed image data.

7. The validation method of claim 6 wherein performing the image reconstruction algorithm comprises performing an artificial intelligence (AI) algorithm.

8. The validation method of claim 7 wherein performing the AI algorithm comprises training the AI algorithm based on training data using neural networks.

9. The validation method of claim 5 wherein performing the analytical forward projection of the reconstructed image data comprises multiplying a system response matrix with the reconstructed image data, wherein the system response matrix defines a mapping from image space to data space.

10. The validation method of claim 5 wherein performing the image reconstruction algorithm comprises performing an iterative image reconstruction algorithm.

11. The validation method of claim 5 wherein the likeness discriminator comprises an equality operator.

12. The validation method of claim 5 wherein the likeness discriminator comprises a stop condition of an iterative image reconstruction algorithm.

13. The validation method of claim 5 wherein the likeness discriminator comprises a statistical test.

14. The validation method of claim 5 wherein the likeness discriminator comprises a minimization objective function.

15. One or more non-transitory computer-readable media embodying instructions executable by a machine to perform operations for validation, comprising:
   receiving original input data and reconstructed image data generated by an image reconstruction algorithm based on the original input data;
   performing analytical forward projection of the reconstructed image data to generate an algorithmic version of the original input data;
   generating a validation value that validates the image reconstruction algorithm by applying the original input data and the algorithmic version of the original input data as input to a likeness discriminator, wherein the validation value is a Boolean value that indicates whether the reconstructed image data is a good solution given the original input data; and
   performing, in response to the validation value, diagnostics, evaluation or planning for future treatment based on the reconstructed image data.

16. The one or more non-transitory computer-readable media of claim 15 wherein the operations for validation further comprise performing the image reconstruction algorithm based on the original input data to generate the reconstructed image data.

17. The one or more non-transitory computer-readable media of claim 16 wherein performing the image reconstruction algorithm comprises performing an iterative image reconstruction algorithm.

18. The one or more non-transitory computer-readable media of claim 15 wherein performing the analytical forward projection of the reconstructed image data comprises multiplying a system response matrix with the reconstructed image data, wherein the system response matrix defines a mapping from image space to data space.

19. The one or more non-transitory computer-readable media of claim 15 wherein performing the image reconstruction algorithm comprises performing a multiplicative statistical, likelihood-based algorithm.

20. The one or more non-transitory computer-readable media of claim 15 wherein the likeness discriminator comprises a stop condition of an iterative image reconstruction algorithm.

\* \* \* \* \*